(12) United States Patent
Hirasawa et al.

(10) Patent No.: US 10,525,786 B2
(45) Date of Patent: Jan. 7, 2020

(54) BATTERY TEMPERATURE CONTROL DEVICE AND BATTERY TEMPERATURE CONTROL SYSTEM

(71) Applicants:Furukawa Electric Co., Ltd., Tokyo (JP); Furukawa Automotive Systems Inc., Shiga (JP)

(72) Inventors: Takeshi Hirasawa, Tokyo (JP); Masami Ikeda, Tokyo (JP)

(73) Assignees: Furukawa Electric Co., Ltd., Tokyo (JP); Furukawa Automotive Systems Inc., Shiga (JP)

( * ) Notice: Subject to any disclaimer, the term of this patent is extended or adjusted under 35 U.S.C. 154(b) by 33 days.

(21) Appl. No.: 15/680,410

(22) Filed: Aug. 18, 2017

(65) Prior Publication Data

US 2017/0341483 A1 Nov. 30, 2017

Related U.S. Application Data

(63) Continuation of application No. PCT/JP2016/054633, filed on Feb. 18, 2016.

(30) Foreign Application Priority Data

Feb. 18, 2015 (JP) .................................. 2015-029932

(51) Int. Cl.
*H01M 10/617* (2014.01)
*B60H 1/00* (2006.01)
(Continued)

(52) U.S. Cl.
CPC ....... *B60H 1/00278* (2013.01); *B60H 1/3227* (2013.01); *B60K 1/04* (2013.01);
(Continued)

(58) Field of Classification Search
CPC . H01M 10/613; H01M 10/617; H01M 10/625
See application file for complete search history.

(56) References Cited

U.S. PATENT DOCUMENTS

2010/0279159 A1* 11/2010 Meintschel ......... H01M 6/5038
429/94
2011/0138626 A1 6/2011 Tirumalai et al.
(Continued)

FOREIGN PATENT DOCUMENTS

CN 102301523 A 12/2011
CN 102549348 A 7/2012
(Continued)

OTHER PUBLICATIONS

English Translation of First Office Action dated Dec. 26, 2018 in a corresponding CN application No. 201680004760.7.
(Continued)

*Primary Examiner* — Olatunji A Godo
(74) *Attorney, Agent, or Firm* — Dorsey & Whitney LLP

(57) ABSTRACT

A battery temperature control device comprises: a battery including a battery cell; and a thermally conductive member having one end portion thermally connected to the battery, wherein another end portion of the thermally conductive member is thermally connected to a fin of a condenser and/or an evaporator, and the fin of the condenser and/or the evaporator is disposed at a passage through which a fluid flows and the passage is brandied into a plurality of paths at a position downstream of the fin of the condenser and/or the evaporator in a direction of a flow of the fluid.

16 Claims, 9 Drawing Sheets

(51) Int. Cl.
*H01M 10/625* (2014.01)
*H01M 10/6551* (2014.01)
*H01M 10/6552* (2014.01)
*H01M 10/6571* (2014.01)
*B60K 11/02* (2006.01)
*H01M 10/647* (2014.01)
*H01M 10/663* (2014.01)
*B60K 1/04* (2019.01)
*H01M 10/6554* (2014.01)
*H01M 10/6563* (2014.01)
*B60H 1/32* (2006.01)
*H01M 10/613* (2014.01)
*H01M 10/615* (2014.01)
*B60K 11/04* (2006.01)
*B60K 1/00* (2006.01)

(52) U.S. Cl.
CPC ........... *B60K 11/02* (2013.01); *H01M 10/617* (2015.04); *H01M 10/625* (2015.04); *H01M 10/647* (2015.04); *H01M 10/6551* (2015.04); *H01M 10/6552* (2015.04); *H01M 10/6554* (2015.04); *H01M 10/6563* (2015.04); *H01M 10/6571* (2015.04); *H01M 10/663* (2015.04); *B60H 2001/00307* (2013.01); *B60K 11/04* (2013.01); *B60K 2001/005* (2013.01); *H01M 10/613* (2015.04); *H01M 10/615* (2015.04); *H01M 2220/20* (2013.01)

(56) References Cited

U.S. PATENT DOCUMENTS

| 2011/0200860 | A1* | 8/2011 | Brodie | H01M 2/1061 |
| | | | | 429/120 |
| 2011/0206965 | A1* | 8/2011 | Han | F28D 15/0233 |
| | | | | 429/120 |
| 2011/0318626 | A1 | 12/2011 | Bartenschlager | |
| 2012/0132401 | A1 | 5/2012 | Baek et al. | |
| 2012/0186278 | A1 | 7/2012 | Hayashida et al. | |

FOREIGN PATENT DOCUMENTS

| JP | 11-204151 | 7/1999 |
| JP | 2008055990 A | 3/2008 |
| JP | 2010132098 A | 6/2010 |
| JP | 2012-510697 | 5/2012 |
| JP | 2012-112373 | 6/2012 |
| JP | 4952867 B2 | 6/2012 |
| JP | 2013-062023 | 4/2013 |
| JP | 2014-229480 | 12/2014 |
| WO | 2008/026386 A1 | 3/2008 |
| WO | 2010/064614 A1 | 6/2010 |

OTHER PUBLICATIONS

English Translation of International Preliminary Report on Patentability Chapter I, dated Aug. 22, 2017, for Application No. PCT/JP2016/054633.
English Translation of Written Opinion of the International Search Authority, dated Aug. 25, 2016, for Application PCT/JP2016/054633.
International Search Report and Written Opinion received in PCT/JP2016/054633 dated Mar. 22, 2016 (English translation of ISR).
English translation of Office action received in Chinese Application No. 201680004760.7 dated Jun. 5, 2019.
English translation of Third Office Action for CN Application No. 201680004760.7, dated Oct. 23, 2019.
English translation of Office Action dated Oct. 29, 2019 in JP application No. 2017-500725.

* cited by examiner

BATTERY TEMPERATURE CONTROL DEVICE AND BATTERY TEMPERATURE CONTROL SYSTEM

CROSS REFERENCE TO RELATED APPLICATIONS

This is a continuation application of International Patent Application No. PCT/JP2016/054633 filed on Feb. 18, 2016, which claims the benefit of Japanese Patent Application No. 2015-029932, filed on Feb. 18, 2015, the full contents of all of which are hereby incorporated by reference in their entirety.

BACKGROUND

Technical Field

The present disclosure relates to a battery temperature control device and a battery temperature control system which transport heat generated from a battery to a fin of a condenser and/or an evaporator by using a thermally conductive member.

Background

As a battery temperature control system of a related art, the following system is proposed (International Publication No. WO 2008/026386). That is, the system includes: a battery that is installed in a vehicle and used for traveling; a blower fan that is provided separately from that for vehicle interior air-conditioning and generates a flow of air to the battery; and a heat exchanger that is provided separately from that for vehicle interior air-conditioning and cools the air by heat exchange between a refrigerant flowing through the inside of the vehicle and the air to be supplied to the battery. An evaporator serving as the heat exchanger shares the refrigerant with the vehicle interior air-conditioning.

However, in international Publication No. WO 2008/026386, the battery is cooled by supplying an air cooled by a refrigerant. However, since the battery is cooled through the air, there is a problem that the heat transfer efficiency is not sufficient. Further, in International Publication No. WO 2008/026386, since it is difficult to make the air flow uniform, the temperature of an air to be supplied to each battery cell constituting the battery varies depending on the difference of the air path (e.g., a difference between an upstream side and a downstream side of the air flow). This causes another problem that it takes a time to cool the battery and the temperature of each battery cell varies.

As another battery temperature control system, the following system is proposed (Japanese: Laid-Open Patent Publication No. H11-204151). The system includes: a coolant passage that is structured to connect a heat pipe to a battery module, has another end portion connected to a heat sink, and transport heat generated by a battery to the heat sink, includes a heat storage material, such as paraffin, in the heat sink, and passes through the inside of the heat storage material; a coolant pipe connected to the coolant passage; a motor pump; and a radiator.

Although the battery module is cooled through the heat pipe connected to the coolant pipe in Japanese Laid-Open Patent Publication No. H11-204151, the mass of the water-cooled system is large, which causes a problem that the travel distance of the vehicle is shortened. The motor pump that is essential for generating a flow of water has a large power consumption. Also in this regard, there is a problem that the travel distance of the vehicle is shortened.

As a cooling device for a vehicle, a cooling device for a vehicle in which one or more heat pipes penetrating through at least two or more refrigerant passage pipes through the same cooling system core portion are mounted is proposed (Japanese Laid-Open Patent Publication No. 2012-112373).

However, in the system in which the same cooling system core portion is installed and cooled as disclosed in Japanese Laid-Open Patent Publication No. 2012-112373, the mass of the vehicle and the power consumption for cooling the refrigerant are increased, which also causes the problem that the travel distance of the vehicle is shortened.

SUMMARY

The present disclosure is related to providing a battery temperature control device and a battery temperature control system which are excellent in heat transfer efficiency and uniformity of temperature control performance and can prevent an increase in mass and power consumption.

A first aspect of the present disclosure is a battery temperature control device including: a battery including a battery cell; and a thermally conductive member having one end portion thermally connected to the battery. Another end portion of the thermally conductive member is thermally connected to a fin of a condenser or an evaporator. The fin of the condenser and/or the evaporator is disposed at a passage through which a fluid flows and the passage is branched into a plurality of paths at a position downstream of the fin of the condenser and/or the evaporator in a direction of a flow of the fluid.

In the above-mentioned aspect, the battery and the fin of the condenser or the evaporator are thermally connected through the thermally conductive member. When the battery and the evaporator are thermally connected to cool the battery, heat generated from the battery is transported from the battery to one end portion of the thermally conductive member and the heat transported to the one end portion of the thermally conductive member is transported from the one end portion of the thermally conductive member to another end portion thereof. The heat transported to the other end portion of the thermally conductive member is transported from the other end portion of the thermally conductive member to the evaporator thermally connected to the other end portion of the thermally conductive member. The heat transported to the evaporator is emitted to the outside from the evaporator.

On the other hand, when the battery and the condenser are thermally connected to thereby cool the battery, the other end portion of the thermally conductive member is thermally connected to a fin of a condenser so that the heat generated from the condenser can be prevented from being transported from the condenser to the other end portion of the thermally conductive member. Thus, the battery can be cooled due to an action similar to the cooling action of the battery when the above-mentioned battery and the evaporator are thermally connected.

According to the above-mentioned aspect, in a structure in which the battery is cooled only by the evaporator, the thermally conductive member is thermally connected to the evaporator, instead of being thermally connected to the fin of the condenser. In a structure in which the battery is cooled only by the fin of the condenser, the thermally conductive member is thermally connected to the fin of the condenser, instead of being thermally connected to the evaporator. The above-mentioned various aspects can be selected as appropriate depending on the usage of the battery temperature control system.

A second aspect of the present disclosure is a battery temperature control device including: a battery including a battery cell; and a first thermally conductive member and a second thermally conductive member, one end portion of each of the first thermally conductive member and the second thermally conductive member being thermally connected to the battery. Another end portion of the first thermally conductive member is thermally connected to a fin of a condenser, and another end portion of the second thermally conductive member is thermally connected to an evaporator.

Examples of the structure in which the battery is thermally connected to the evaporator and the fin of the condenser through the thermally conductive member include an aspect in which a plurality of thermally conductive members are prepared; at least one thermally conductive member is thermally connected to the evaporator, instead of being thermally connected to the fin of the condenser; and the other thermally conductive members are thermally connected to the fin of the condenser, instead of being thermally connected to the evaporator.

In the battery temperature control device according to the aspect of the present disclosure, the thermally conductive member is a heat pipe.

In the battery temperature control device according to the aspect of the present disclosure, another end portion of the thermally conductive member is detachable from the fin of the condenser and/or the evaporator.

In the battery temperature control device according to the aspect of the present disclosure, the fin of the condenser and/or the evaporator forms a heat pump mechanism.

In the battery temperature control device according to the aspect of the present disclosure, a circulation path closed to an external environment is formed by connecting at least one of the paths to the passage at a position upstream of the fin of the condenser and/or the evaporator in a direction of the flow of the fluid. In the above-mentioned aspect, the fluid which has reached a downstream side of the fin of the condenser and/or the evaporator is returned from the downstream side to the upstream side of the fin of the condenser and/or the evaporator through the circulation path.

In the battery temperature control device according to the aspect of the present disclosure, the circulation path includes a valve mechanism as a unit configured to select the paths.

In the battery temperature control device according to the aspect of the present disclosure, a circulation path closed to an external environment is formed by connecting at least one of the paths to the passage at a position upstream of the fin of the condenser and/or evaporator in a direction of the flow of the fluid; the battery temperature control device is mounted on a vehicle; and the flow of the fluid is an airflow.

In the above-mentioned aspect, another end portion of the thermally; conductive member is thermally connected to an evaporator, which is a component for air-conditioning of a vehicle cabin, and/or a fin of a condenser as a component for air-conditioning of a vehicle cabin.

In the battery temperature control device according to the aspect of the present disclosure, the circulation path is formed so as not to pass through an inside of an engine room of the vehicle and an inside of a cabin of the vehicle.

In the battery temperature control device according to the aspect of the present disclosure, a fan for generating the airflow is provided.

In the battery temperature control device according to the aspect of the present disclosure, the airflow is derived from vehicle traveling wind. In this aspect, traveling wind is used to obtain the airflow, in place of the fan as a unit configured to generate the airflow.

A third aspect of the present disclosure is a battery temperature control system including: a battery including a battery cell; a thermally conductive member having one end portion thermally connected to the battery; and a fin of a condenser and/or an evaporator thermally connected to another end portion of the thermally conductive member. The fin of the condenser and/or the evaporator is disposed at a passage through which a fluid flows and the passage is branched into a plurality of paths at a position downstream of the fin of the condenser and/or the evaporator in a direction of a flow of the fluid. When the battery is cooled, heat generated from the battery is transported to the fin of the condenser and/or the evaporator by the thermally conductive member.

The battery temperature control system according to the aspect of the present disclosure further includes another thermally conductive member. In the battery temperature control system, one end portion of the other thermally conductive member is thermally connected to the battery, and another end portion of the other thermally conductive member is thermally connected to a heat generation portion; and when the battery is heated, heat generated from the heat generation portion is transported to the battery by the other thermally conductive member.

According to aspects of the present disclosure, the battery is thermally connected to the existing fin of the condenser and/or the evaporator through the thermally conductive member, which eliminates the need for using a water-cooled system or refrigerant and prevents an increase in mass and power consumption. Further, since the temperature of the battery is controlled through the thermally conductive member, there is no need to use an air cooled by the refrigerant, with the result that an excellent heat transfer efficiency and excellent uniformity in temperature control performance can be obtained. Furthermore, since the battery is thermally connected to the existing fin of the condenser and/or the evaporator through the thermally conductive member, heat generated from the battery is transported to the fin of the condenser and/or the evaporator which is at a temperature relatively lower than the battery, even when the evaporator and the condenser are not operated (the air-conditioning system is not operated). This leads to a reduction in power consumption for cooling the battery.

According to aspects of the present disclosure, since the heat generated from each battery cell is transported through the thermally conductive member, there is no need to provide a gap or duct between the battery cells to cause the fluid for temperature control to flow, and the size of a battery container can be greatly reduced, which is advantageous for space saving. Moreover, since the size of the battery container can be greatly reduced, the number of battery cells in the same space can be greatly increased, with the result that an increase in charging capacity can be realized.

According to aspects of the present disclosure, the thermally conductive member is a heat pipe, which leads to an improvement in the heat transportation efficiency of the thermally conductive member and a further improvement in the temperature control efficiency of the battery. Further, since the heat pipe is hollow, the battery temperature control system can be further reduced in weight.

According to aspects of the present disclosure, the other end portion of the thermally conductive member is detachable from the fin of the condenser and/or the evaporator, which leads to an improvement in the transportation performance and attachment performance of the battery temperature control system.

According to aspects of the present disclosure, the passage is branched into a plurality of paths on the downstream side of the evaporator and/or the condenser, so that heat generated from the battery can be reliably transported to a desired location from the evaporator and/or the condenser.

According to the aspects of the present disclosure, it is possible to provide a battery temperature control system that is mounted on a vehicle and includes a circulation path closed to an external environment, thereby reliably preventing heat generated from the battery from being transported to an undesired location, such as a cabin and an engine room of the vehicle.

DETAILED DESCRIPTION

Figure 1:
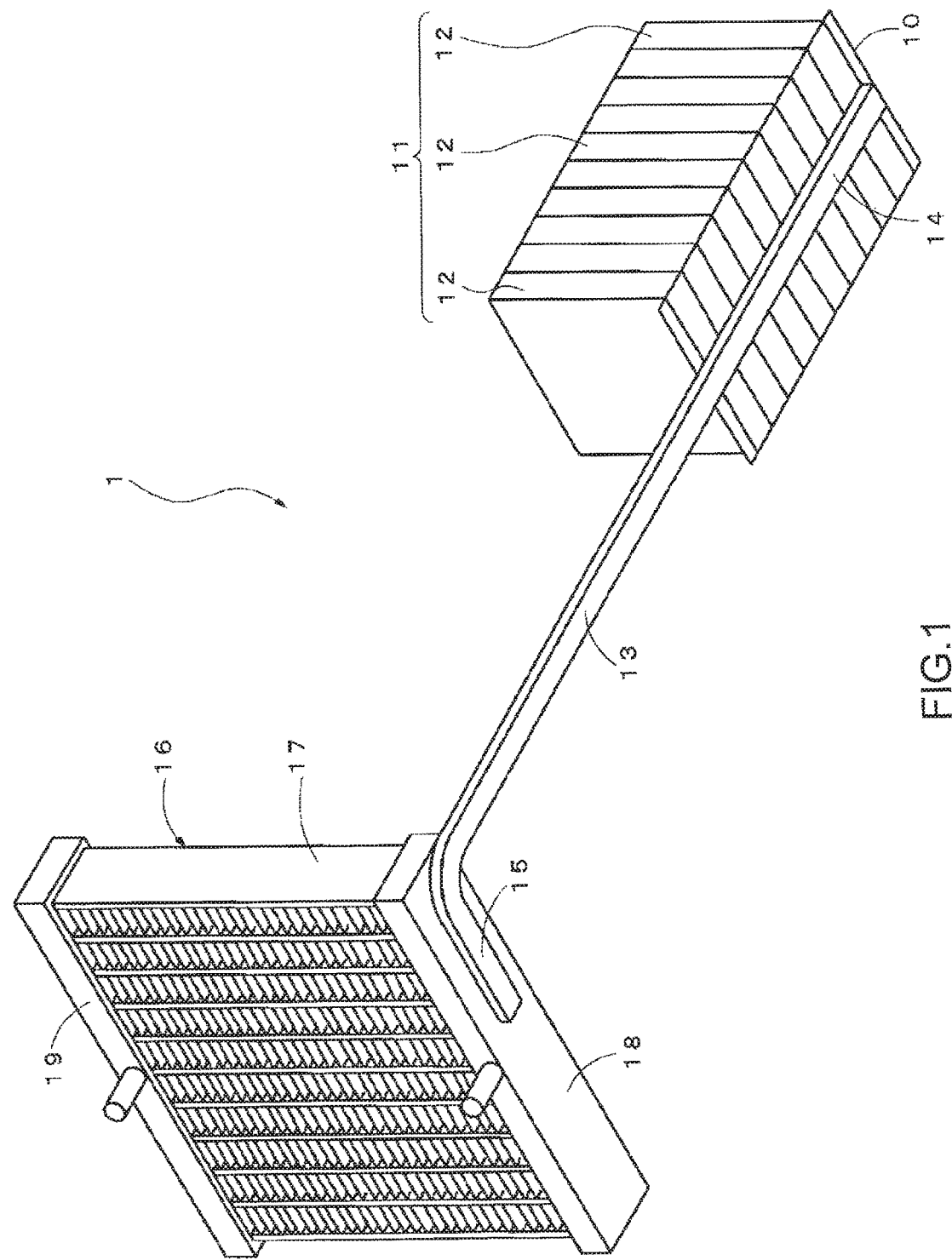
FIG. 1 is a perspective view of a battery temperature control system according to a first embodiment.

A battery temperature control system according to a first embodiment of the present disclosure will be described below with reference to the drawings. As shown in FIG. 1, a battery temperature control system 1 according to a first embodiment includes a battery 11 including a plurality of battery cells 12, heat pipes 13 each having one end portion 14 that is thermally connected to the battery 11, and an evaporator (heat pump evaporator) 16 that is directly in contact with another end portion 15 of each heat pipe 13 and thus is thermally connected to each heat pipe 13. That is, the evaporator 16 is directly in contact with the other end portion 15 of each heat pipe 13.

The battery 11 includes a heat receiving plate 10 that is in contact with a side surface of each battery cell 12. The surface of the heat receiving plate 10 comes into contact with the side surface of each battery cell 12, thereby allowing the heat receiving plate 10 and the battery cell 12 to be thermally connected. One end portion 14 of each heat pipe 13 is directly in contact with the back surface of the heat receiving plate 10, thereby allowing the heat receiving plate 10 and the one end portion 14 of each heat pipe 13 to be thermally connected. Accordingly, the battery 11 and each heat pipe 13 are thermally connected through the heat receiving plate 10.

To improve the thermal connectivity between the battery 11 and the evaporator 16, a portion of each heat pipe 13 that is in contact with the heat receiving plate 10 of the battery 11 and a portion of each heat pipe 13 that is in contact with the evaporator 16, i.e., one end portion 14 and another end portion 15, are processed into a flat shape.

As shown in FIG. 1, the evaporator 16 includes a body portion 17, a supply header portion 18 that supplies a liquid refrigerant to the body portion 17, and a discharge header portion 19 that discharges the refrigerant vaporized by the body portion 17. The refrigerant is vaporized by the body portion 17 and removes heat from the body portion 17 and cools the evaporator 16.

Figure 2:
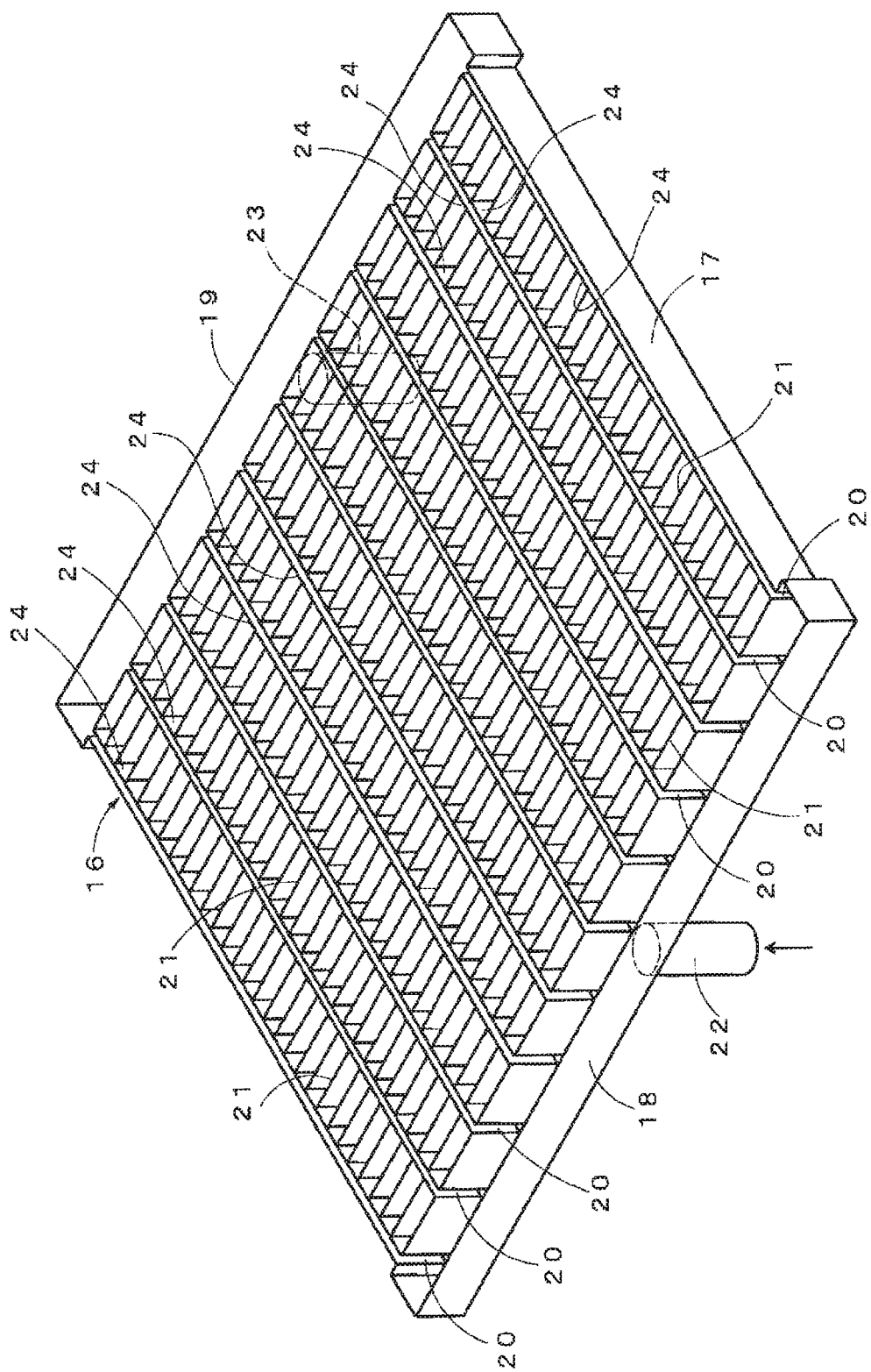
FIG. 2 is an explanatory view showing an evaporator of the battery temperature control system according to the first embodiment.
Figure 3:
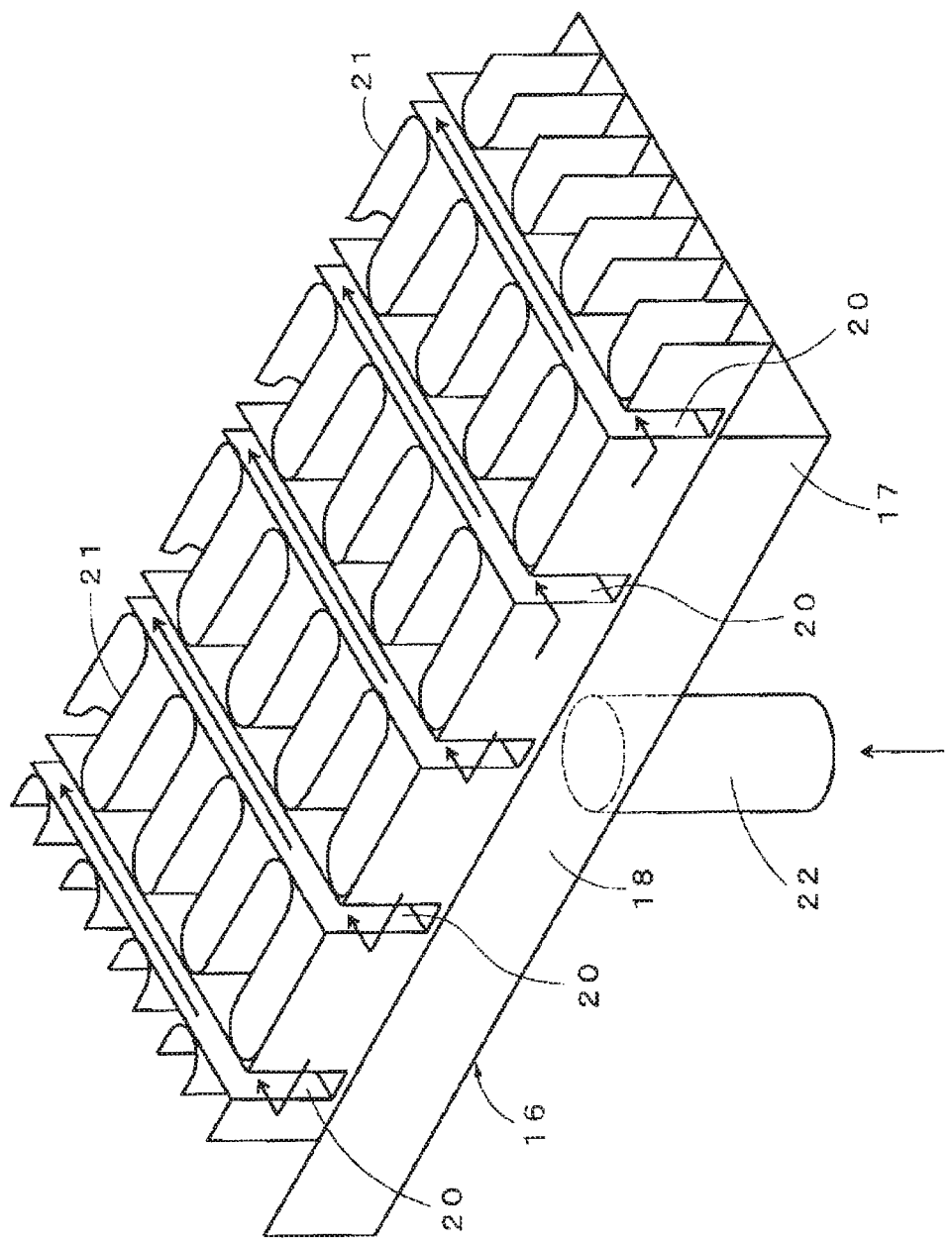
FIG. 3 is a partial enlarged view of the evaporator shown in FIG. 2.

As shown in FIGS. 2 and 3, the body portion 17 is provided with a plurality of (eleven in FIG. 2) passages 20 for the refrigerant (as indicated by an arrow in the drawings), and corrugated radiation fins 21 are disposed between the passages 20. Referring to FIG. 2, 10 corrugated radiation fins 21 are partitioned by partition plates 24, respectively, thereby forming 11 passages 20.

The supply header portion 18 is provided with a refrigerant supply port 22, and the refrigerant supply port 22 communicates with one of openings of each passage 20 of the body portion 17 through the inside space of the supply header portion 18. The discharge header portion 19 is provided with a refrigerant outlet 23, and the refrigerant outlet 23 communicates with the other one of the openings of each passage 20 of the body portion 17 through the inside space of the discharge header portion 19. Accordingly, the liquid refrigerant supplied from the refrigerant supply port 22 of the supply header portion 18 flows into the passages 20 (11 passages 20 in FIG. 2) of the body portion 17 through the inside space of the supply header portion 18, and the refrigerant is vaporized while flowing from one opening to the other opening of each passage 20. When the refrigerant is being vaporized in each passage 20, the refrigerant removes heat from the body portion 17 through the radiation fins 21 (10 radiation fins 21 in FIG. 2) disposed between the passages 20, thereby cooling the evaporator 16. The vaporized refrigerant flows into the refrigerant outlet 23 from the other opening of each passage 20 through the inside space of the discharge header portion 19, and is emitted to the outside of the evaporator 16 from the refrigerant outlet 23.

As shown in FIG. 1, in the battery temperature control system 1 according to the first embodiment, the other end portion 15 of each heat pipe 13 comes into contact with the outer surface of the supply header portion 18 of the evaporator 16, thereby allowing each heat pipe 13 and the evaporator 16 to be thermally connected. In the battery temperature control system 1, in order to increase the contact area between the supply header portion 18 of the evaporator 16 and the other end portion 15 of each heat pipe 13, each heat pipe 13 is bent in the vicinity of the other end portion 15 of each heat pipe 13 and formed into an L-shape.

As described above, since the evaporator 16 is cooled by the refrigerant, heat generated from the battery 11 is transported to the evaporator 16 by each heat pipe 13, so that the battery is cooled. Even when the evaporator 16 is not operated, heat generated from the battery 11, which has increased in temperature, is transported to the evaporator 16, which is at a temperature relatively lower than the battery 11, by each heat pipe 13.

Next, a battery temperature control system according to a second embodiment of the present disclosure will be described with reference to the drawings. Note that the elements of the battery temperature control system that are the same as those of the battery temperature control system 1 are denoted by the same reference numerals.

Figure 4:
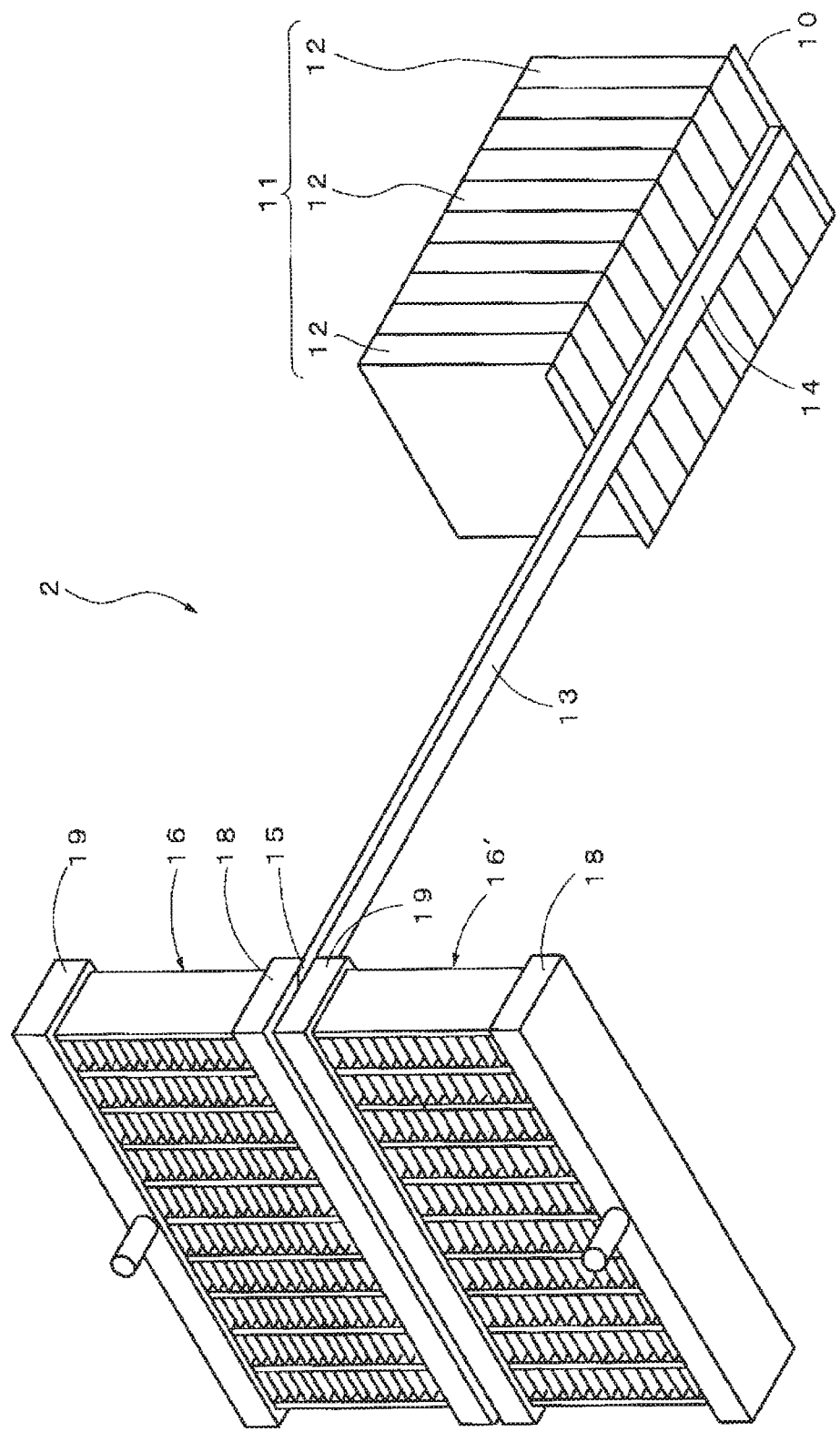
FIG. 4 is a perspective view of a battery temperature control system according to a second embodiment.

As shown in FIG. 4, in a battery temperature control system 2 according to a second embodiment, two evaporators 16 of the battery temperature control system 1 are used. Specifically, in the battery temperature control system 2, two evaporators 16 and 16' are thermally connected to each heat pipe 13.

In the battery temperature control system 2, the other end portion 15 of each heat pipe 13 is thermally connected to the supply header portion 18 of the first evaporator 16, and is also thermally connected to the discharge header portion 19 of the second evaporator 16'. Specifically, the front surface of the other end portion 15 of each heat pipe 13 is directly in contact with the outer surface of the supply header portion 18 of the first evaporator 16, thereby allowing each heat pipe 13 and the first evaporator 16 to be thermally connected, and the back surface of the other end portion 15 of each heat pipe 13 is directly in contact with the outer surface of the discharge header portion 19 of the second evaporator 16', thereby allowing each heat pipe 13 and the second evaporator 16' to be thermally connected.

In the battery temperature control system 2, the other end portion 15 of each heat pipe 13 is sandwiched between the first evaporator 16 and the second evaporator 16', thereby further improving the cooling performance for the battery 11.

Next, a battery temperature control system according to a third embodiment of the present disclosure will be described with reference to the drawings. Note that the elements of the battery temperature control system that are the same as those of the battery temperature control systems 1 and 2 are denoted by the same reference numerals.

Figure 5:
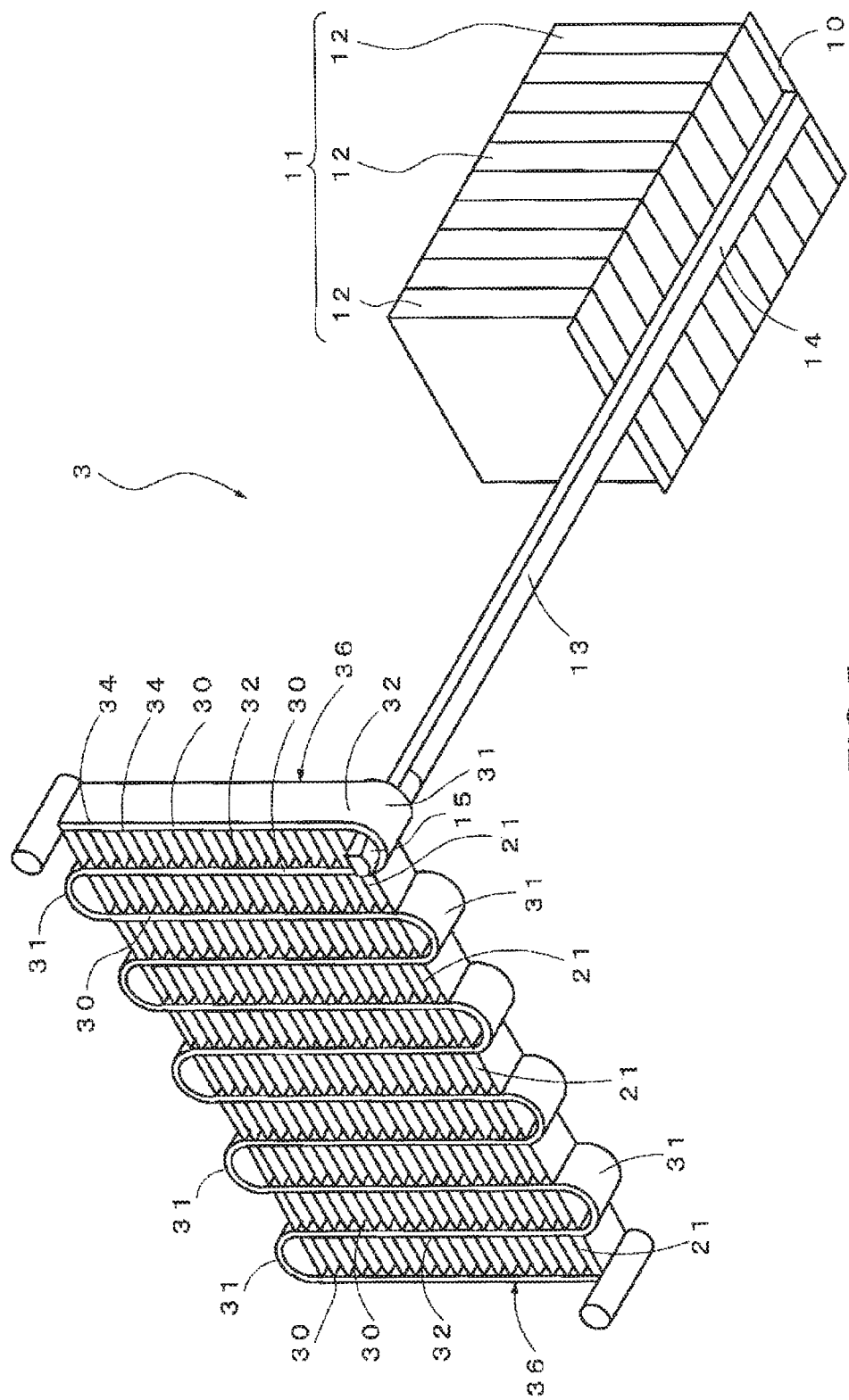
FIG. 5 is a perspective view of a battery temperature control system according to a third embodiment.

As shown in FIG. 5, in a battery temperature control system 3 according to the third embodiment, the other end portion 15 of each heat pipe 13 is directly in contact with passages 30 for the refrigerant that are provided in an evaporator 36. In the battery temperature control system 3, one battery 11 and one evaporator 36 are thermally connected through one linear heat pipe 13.

In the battery temperature control system 3, the passages 30 each have a winding shape including a curved portion 31, which is curved in a semicircular shape, and a straight portion 32. The other end portion 15 of each heat pipe 13 is in contact with the curved portion 31, which is curved in a semicircular shape in each passage 30, from the inside of the curved portion 31. The passages 30 are each formed by locating two partition plates 34, which have a winding shape, so as to face each other. In the battery temperature control system 3, each passage 30 is provided with a plurality of (ten in FIG. 5) curved portions 31, and a plurality of (eleven in FIG. 5) straight portions 32.

Figure 6:
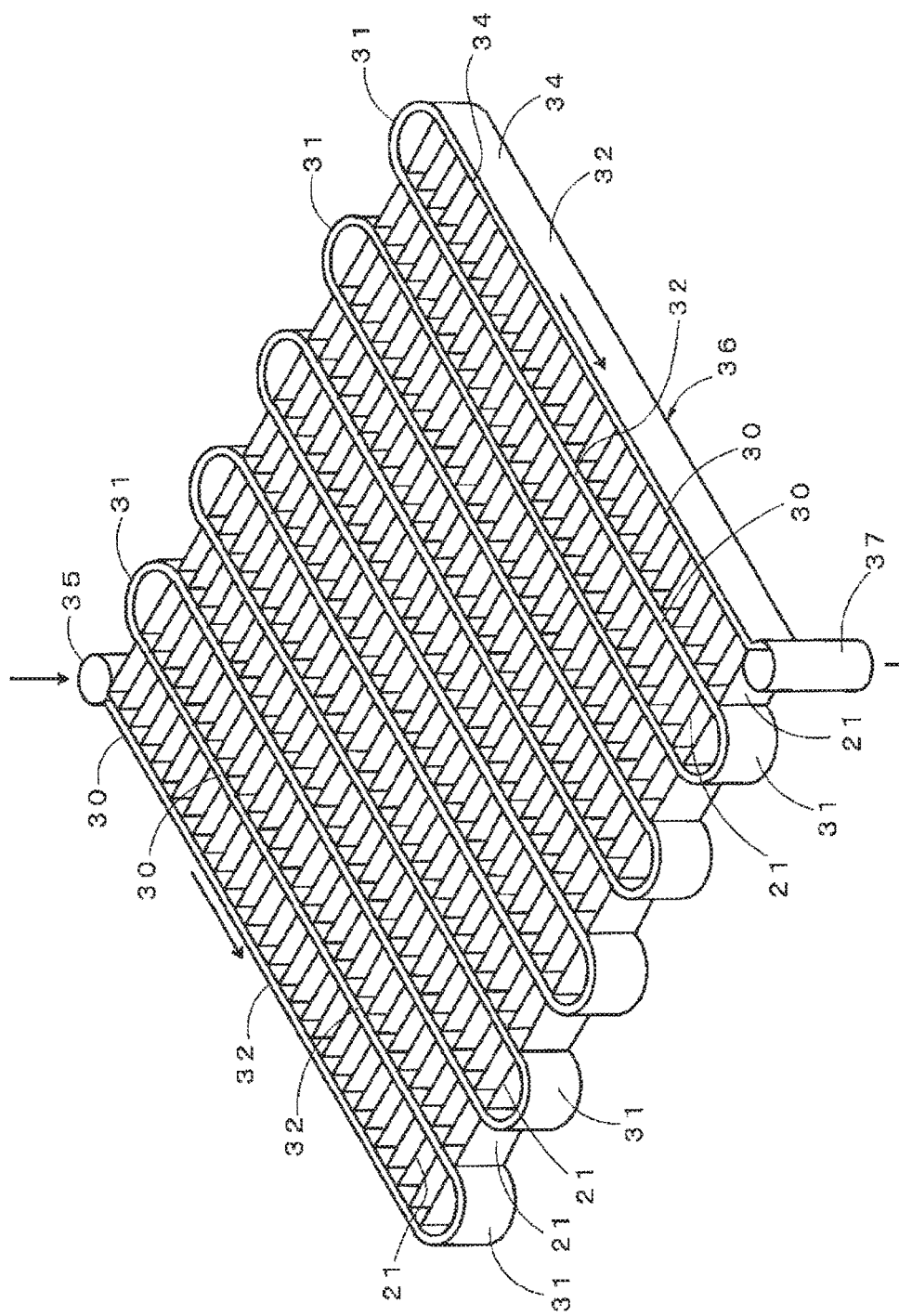
FIG. 6 is an explanatory view showing an evaporator of the battery temperature control system according to the third embodiment.

As shown in FIGS. 5 and 6, in the evaporator 36, a plurality of (ten in FIGS. 5 and 6) corrugated radiation fins 21 is disposed in a section other than the curved portions 31 of the winding partition plate 34 constituting each passage 30, i.e., in the straight portions 32. In the evaporator 36, the straight portions 32 of the partition plate 34 constituting each passage 30 are directly in contact with the corrugated radiation fins 21, thereby allowing the passages 30 and the corrugated radiation fins 21 to be thermally connected.

As shown in FIG. 5, the other end portion 15 of each heat pipe 13 has a shape corresponding to the shape of the curved portions 31 of the passages 30. Specifically, the shape in the thickness direction of the other end portion 15 is a semicircular shape, which improves the thermal conductivity between each heat pipe 13 and the passages 30.

As shown in FIG. 6, in the evaporator 36, a refrigerant supply port 35 for supplying the refrigerant to each passage 30 is provided at one end portion of each winding passage 30, and a refrigerant outlet 37 for discharging the refrigerant from each passage 30 is provided at another end portion of each winding passage 30. Accordingly, the refrigerant (as indicated by an arrow in the drawings) supplied into each passage 30 from the refrigerant supply port 35 flows among the 10 corrugated radiation fins 21 along the passages 30, and is discharged to the outside of the evaporator 36 from the refrigerant outlet 37.

Next, a battery temperature control system according to a fourth embodiment of the present disclosure will be described with reference to the drawings. Note that the elements of the battery temperature control system that are the same as those of the battery temperature control systems 1, 2, and 3 are denoted by the same reference numerals.

Figure 7:
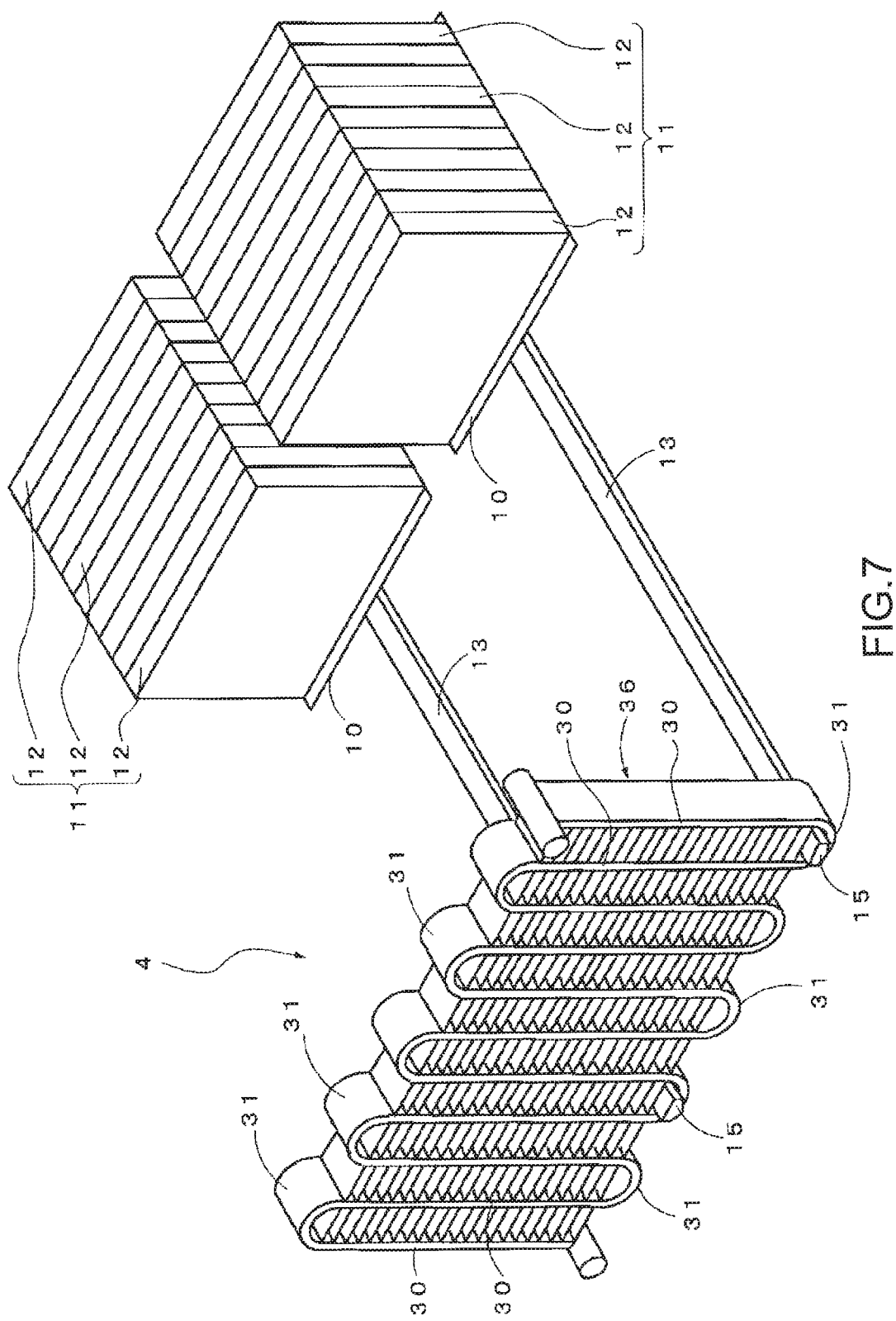
FIG. 7 is a perspective view of a battery temperature control system according to a fourth embodiment.

As shown in FIG. 7, in a battery temperature control system 4 according to the fourth embodiment, one linear heat pipe 13 is directly in contact with a plurality of (two in FIG. 7) curved portions 31 among the plurality of (ten in FIG. 7) curved portions 31 which are curved in a semicircular shape in each passage 30. Also in the battery temperature control system 4, like in the battery temperature control system 3, the curved portions 31, which are curved in a semicircular shape in each passage 30, are in contact with the other end portion 15 of each heat pipe 13 from the inside of the curved portion 31. Also in the battery temperature control system 4, like in the battery temperature control system 3, one battery 11 is thermally connected to each heat pipe 13.

Specifically, in the battery temperature control system 4, a plurality of (two in FIG. 7) batteries 11 is thermally connected to one evaporator 36. As described above, in the battery temperature control system 4, the plurality of batteries 11 can be simultaneously cooled in one evaporator 36.

Next, a battery temperature control system according to a fifth embodiment of the present disclosure will be described with reference to the drawings. Note that the elements of the battery temperature control system that are the same as those of the battery temperature control systems 1, 2, 3, and 4 are denoted by the same reference numerals.

Figure 8:
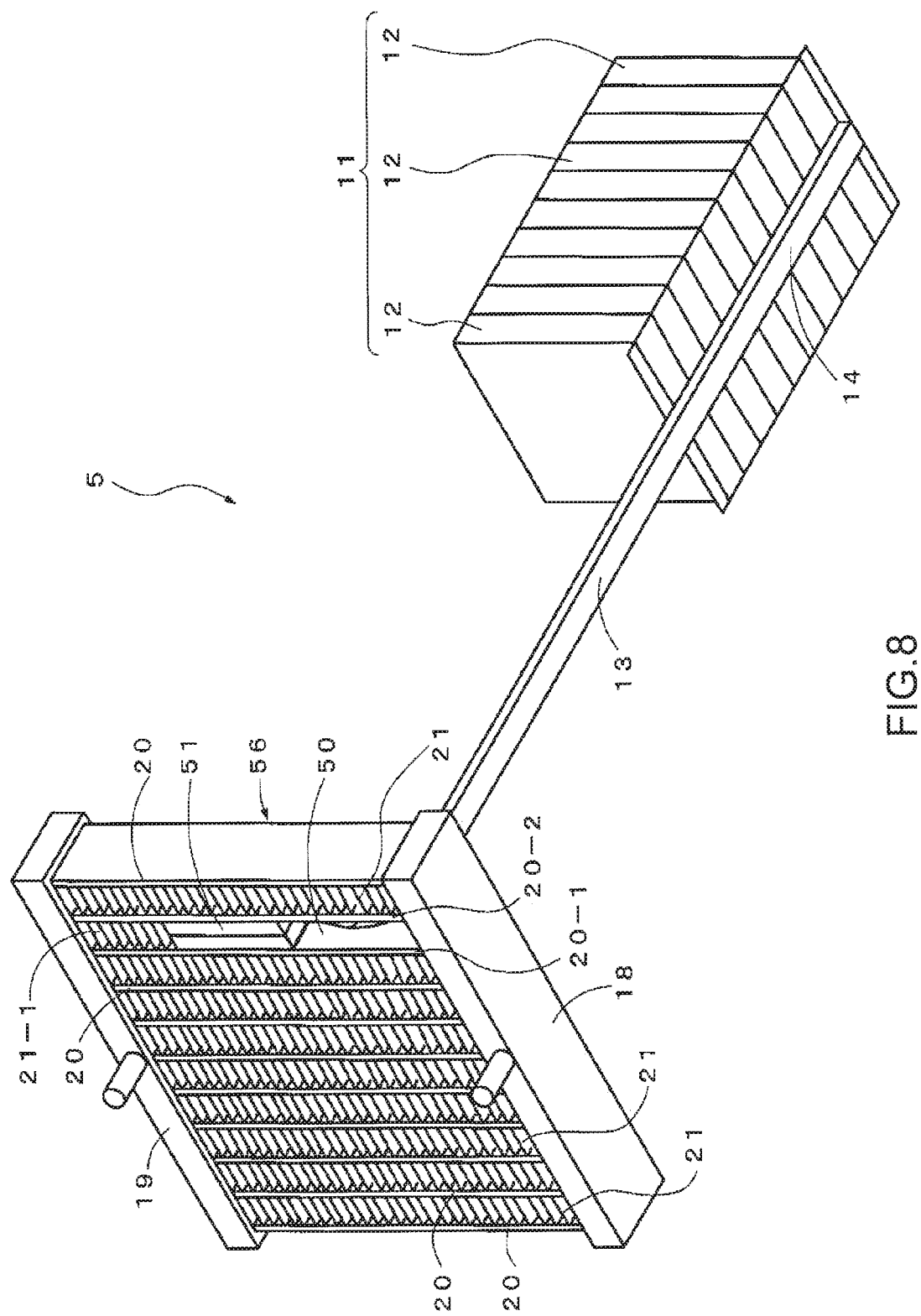
FIG. 8 is a perspective view of a battery temperature control system according to a fifth embodiment.
Figure 9:
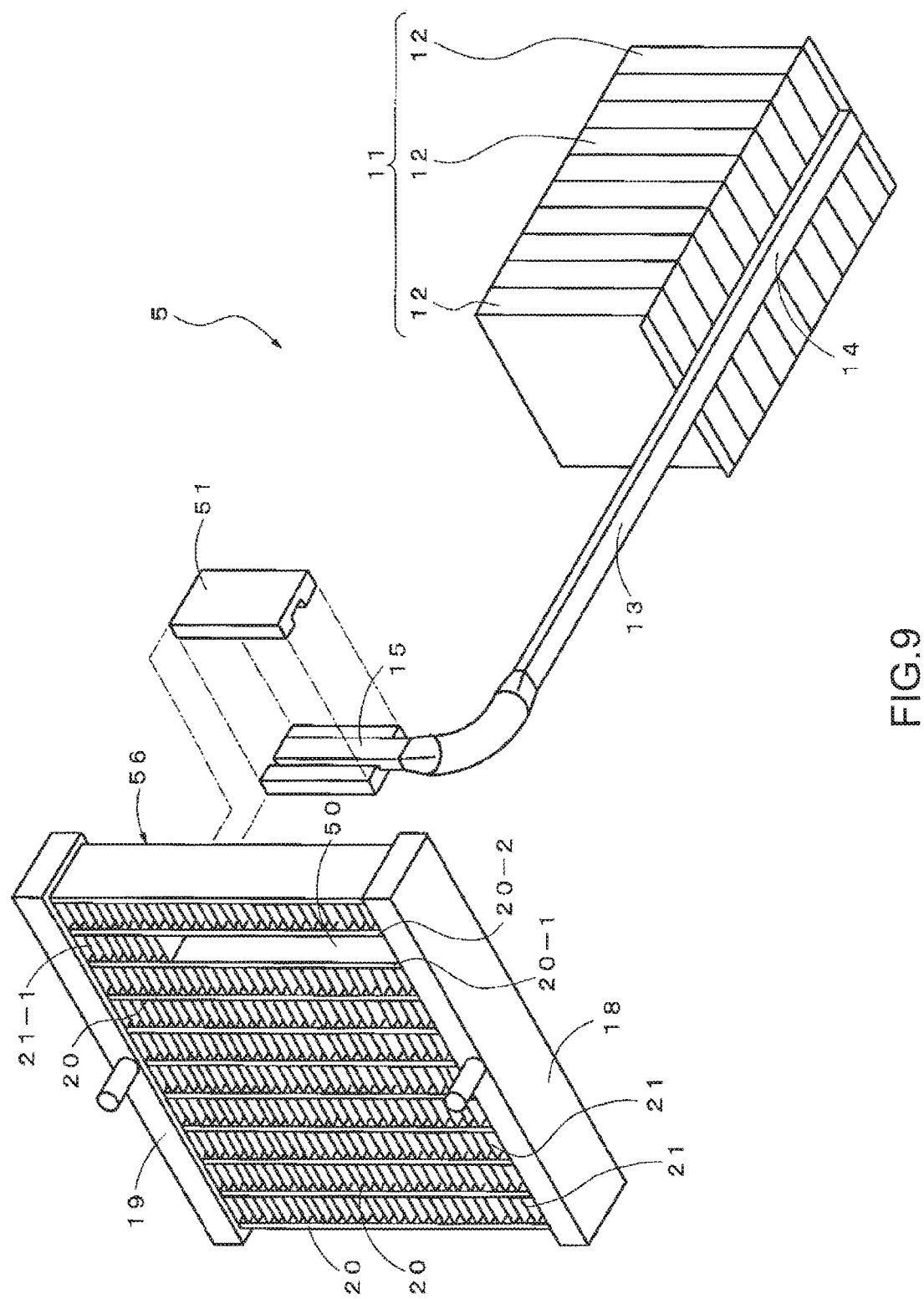
FIG. 9 is an explanatory view showing the battery temperature control system according to the fifth embodiment.

As shown in FIGS. 8 and 9, in a battery temperature control system 5 according to the fifth embodiment, each heat pipe 13 that is bent in the vicinity of the other end portion 15 and formed into an L-shape for the evaporator 16 used in the battery temperature control system 1 according to the first embodiment is thermally connected between a passage 20-1 and a passage 20-2 which are adjacent to each other.

In an evaporator 56 of the battery temperature control system 5, each heat pipe 13 is thermally connected between the passage 20-1 and the passage 20-2, which are adjacent to each other, so that a corrugated radiation fin 21-1 disposed between the passage 204 and the passage 20-2 among the plurality of (ten in FIGS. 8 and 9) corrugated radiation fins 21 is shorter than another corrugated radiation fin 21. In a space portion 50 thus generated, a portion between an end face of the other end portion 15 of each heat pipe 13 to a bent section is inserted into the passages 20 in a parallel direction.

Further, in the battery temperature control system 5, in order to further improve the thermal conductivity between the passages 20 and the heat pipe 13, a metallic block 51 (e.g., a block made of aluminum, aluminum alloy, or the like) which has an outer shape corresponding to the shape of the space portion 50, and an inside space shape corresponding to the outer shape of the other end portion 15 of the heat pipe 13 is used. Specifically, the other end portion 15 of each heat pipe 13 is fitted into the inside space of the metallic block 51, thereby bringing the inner surface of the metallic block 51 and the outer surface of the other end portion 15 of the heat pipe 13 into contact with each other and allowing the metallic block 51 and the other end portion 15 of the heat pipe 13 to be thermally connected. Further, the metallic block 51 to which the other end portion 15 of the heat pipe 13 is fit is fitted into the space portion 50, thereby bringing the passage 20-1 and the passage 20-2, which are adjacent to each other, into contact with the outer surface of the metallic block 51, and allowing the passage 20-1 and the passage 20-2, which are adjacent to each other, and the metallic block 51 to be thermally connected. Thus, the other end portion 15 of each heat pipe 13 is thermally connected to a section between the passage 20-1 and the passage 20-2, which are adjacent to each other, through the metallic block 51.

In the battery temperature control system 5, the metallic block 51 is fitted into the space portion 50 and the other end portion 15 of each heat pipe 13 is thermally connected to the evaporator 56, so that each heat pipe 13 can be easily and reliably attached to the evaporator 56 or detached from the evaporator 56.

A material for the container of each heat pipe 13 used in the battery temperature control system of the present disclosure is not particularly limited. For example, a metal such as copper, a copper alloy, or stainless steel, can be used. An operating fluid for each heat pipe 13 is not particularly limited. For example, water, alcohol, or a substitute for chlorofluorocarbon can be used.

Next, a battery temperature control system according to another embodiment of the present disclosure will be described. In each of the embodiments described above, the other end portion 15 of each heat pipe 13 is thermally connected to the evaporators 16, 36, and 56, but instead may be thermally connected to a condenser (a condenser of a heat pump).

Further, in each of the embodiments described above, the other end portion 15 of each heat pipe 13 is thermally connected to the evaporators 16, 36, and 56, but instead may be thermally connected not only to the evaporators 16, 36, and 56, but also to a fin of a condenser. In this case, a plurality of heat pipes is prepared, and like in each of the embodiments described above, at least one heat pipe (second heat pipe) 13 is thermally connected to the evaporators 16, 36, and 56, without being thermally connected to the fin of the condenser, and another heat pipe (first heat pipe) is thermally connected to the fin of the condenser, without being thermally connected to the evaporators 16, 36, and 56.

In the condenser, for example, the evaporators 16, 36, and 56 and the heat pump mechanism may be formed, like in an air conditioner for a vehicle, or the evaporators 16, 36, and 56 and the heat pump mechanism may not be formed. Further, in each of the embodiments described above, each heat pipe 13 is used as the thermally conductive member serving as a unit configured to transport the heat. However, the thermally conductive member is not limited to the heat pipes 13 or a structure of a similar kind including the operating fluid in the inside space of the member. A bar-like, plate-like, or pipe-like metallic (e.g., copper or the like) or graphite member may be used. The thermally conductive member can be selected, as needed, depending on conditions, such as the amount of necessary transported heat, a transport distance, and a cost. Alternatively, a plurality of types of thermally conductive members may be combined as needed.

In each of the embodiments described above, the other end portion 15 of each heat pipe 13 is directly in contact with a supply header portion, a discharge header portion, or a passage of the evaporator, and thus is thermally connected to the evaporator. Alternatively, the other end portion 15 of the heat pipe 13 may be in contact with the radiation fins 21 of the evaporators 16, 36, and 56, and thus may be thermally connected to the evaporator.

In each of the embodiments described above, the batteries 11 and the evaporators 16, 36, and 56 are thermally connected through one heat pipe 13. Alternatively, a plurality of heat pipes shorter than the heat pipe 13 may be prepared and the plurality of short heat pipes may be thermally connected in a heat transport direction. The plurality of short heat pipes is thermally connected in the heat transport direction, thereby making it possible to transport a larger amount of heat and more reliably unfreeze a frozen operating fluid.

Next, the arrangement of the evaporator used in each of the embodiments described above will be described below. The evaporator is disposed at, for example, a passage through which the fluid flows. For example, when the evaporator is an evaporator of an air conditioner in a vehicle, the evaporator is disposed at a passage through which an airflow generated by an on-vehicle blower fan for air-conditioning, or an airflow derived from traveling wind during traveling of a vehicle, flows. The passage is branched into a plurality of paths at a position downstream of the evaporator in a direction of the airflow, thereby allowing the airflow which has received the heat generated from the battery to flow into one specific path among the plurality of paths. With the structure described above, the heat generated from the battery is allowed to reliably escape from the evaporator to a desired appropriate location by using one specific path. Specifically, the heat generated from the battery can be reliably prevented from being transported to an undesired location (e.g., a cabin or an engine room) for the vehicle.

The above-mentioned one specific path is formed to be connected to the passage at a position upstream of the evaporator in a direction of the airflow. When a circulation path closed to an external environment is formed, the heat generated from the battery can be reliably prevented from being transported to an undesired location through the evaporator. Further, the above-mentioned circulation path is formed so as not to pass through an undesired location, thereby reliably preventing the heat generated from the battery from being transported to an undesired location. Examples of a unit configured to select the plurality of paths may include a valve mechanism.

In the battery temperature control system of the present disclosure, the thermally conductive member having one end portion thermally connected to the battery including a plurality of battery cells can be used not only for cooling the battery, but also for heating the battery. For example, the other end portion of the thermally conductive member, such as a heat pipe, is thermally connected to a heat generation portion, instead of the fin of the condenser and/or the evaporator, to heat the battery, which is cooled to a temperature lower than a temperature appropriate for usage, thereby making it possible to increase the temperature of the battery to the temperature appropriate for usage.

Further, it is possible to adopt a mode in which a plurality of thermally conductive members is prepared, and the other end portion of at least one thermally conductive member is thermally connected to the fin of the condenser or the evaporator, and the other end portion of another thermally conductive member is thermally connected to the heat generation portion. According to the above-mentioned mode, the temperature of the battery can be more easily adjusted within a temperature range appropriate for usage.

For example, in the case of a vehicle including an engine, a pipe for an engine coolant can be used as the heat generation portion. Examples of the pipe for the engine coolant may include a mode in which a brandied pipe to be thermally connected to the other end portion of a thermally conductive member is separately provided and a valve for selecting a pipe through which the engine coolant flows is installed in the branch portion.

In the above-mentioned mode, when it is necessary to increase the temperature of the battery, the valve is manipulated so that the engine coolant heated by the engine flows into the branched pipe (heat generation portion), thereby allowing heat to be transported to the other end portion of the thermally conductive member from the engine coolant flowing through the branched pipe. The heat transported to the other end portion of the thermally conductive member is transported to one end portion of the thermally conductive member from the other end portion thereof. The heat transported to one end portion of the thermally conductive member is transported from one end portion of the thermally conductive member to the battery thermally connected to the one end portion of the thermally conductive member. The battery is heated by the heat transported to the battery and thus the temperature of battery is increased to the temperature appropriate for usage.

For example, in the case of an electric vehicle or a fuel-cell vehicle, a pipe of a heater or a condenser can be used as the heat generation portion, instead of using the pipe for the engine coolant heated by the engine.

In the examples of the embodiments described above, the evaporator is disposed at the passage through which an airflow generated by an on-vehicle blower fan for air-conditioning, or an airflow generated due to the introduction of traveling wind, flows. Alternatively, the evaporator may be disposed at a passage through which other fluids flow, such as a passage through which extremely low temperature cooling liquid nitrogen, liquid helium, rare gasses excellent in thermal conductivity, coolant, or organic solvent for cooling flows.

The battery temperature control device and the battery temperature control system of the present disclosure are excellent in heat transfer efficiency and uniformity of temperature control performance, can prevent an increase in mass and power consumption, and thus can realize downsizing of the battery, or an increase in capacity of the battery. Therefore, the availability of the battery temperature control device and the battery temperature control system of the present disclosure is high in, for example, the field of temperature control of batteries including battery cells mounted on a vehicle.

What is claimed is:

1. A battery temperature control device comprising:
a battery including a battery cell; and
a heat pipe having one end portion thermally connected to the battery, wherein
another end portion of the heat pipe is thermally connected to an evaporator and/or a fin of a condenser, and
the evaporator and/or the fin of the condenser is disposed at a passage through which a fluid flows and the passage is branched into a plurality of paths at a position downstream of the evaporator and/or the fin of the condenser in a direction of a flow of the fluid,
a heat pump mechanism is formed by the condenser and/or the evaporator, the condenser and/or the evaporator is in used an air conditioner for a vehicle.

2. A battery temperature control device comprising:
a battery including a battery cell; and
a first heat pipe and a second heat pipe, one end portion of each of the first heat pipe and the second heat pipe being thermally connected to the battery,
wherein another end portion of the first heat pipe is thermally connected to a fin of a condenser, and another end portion of the second heat pipe is thermally connected to an evaporator,
a heat pump mechanism is formed by the condenser and/or the evaporator, the condenser and/or the evaporator is used in an air conditioner for a vehicle.

3. The battery temperature control device according to claim 1 or 2, wherein another end portion of the heat pipe is detachable from the evaporator and/or the fin of the condenser.

4. The battery temperature control device according to claim 1, wherein a circulation path closed to an external environment is formed by connecting at least one of the paths to the passage at a position upstream of the fin of the condenser and/or the evaporator in a direction of the flow of the fluid.

5. The battery temperature control device according to claim 4, wherein the circulation path includes a valve mechanism as a unit configured to select the paths.

6. The battery temperature control device according to claim 1, 4 or 5 wherein
the battery temperature control device is mounted on a vehicle, and
the flow of the fluid is an airflow.

7. The battery temperature control device according to claim 6, wherein the circulation path is formed so as not to pass through an inside of an engine room of the vehicle and an inside of a cabin of the vehicle.

8. The battery temperature control device according to claim 6, wherein a fan for generating the airflow is provided.

9. The battery temperature control device according to claim 6, wherein the airflow is derived from vehicle traveling wind.

10. A battery temperature control system comprising:
a battery including a battery cell;
a heat pipe having one end portion thermally connected to the battery; and
an evaporator and/or a fin of a condenser thermally connected to another end portion of the heat pipe,
wherein the evaporator and/or the fin of the condenser is disposed at a passage through which a fluid flows and the passage is branched into a plurality of paths at a position downstream of the evaporator and/or the fin of the condenser in a direction of a flow of the fluid, and
when the battery is cooled, heat generated from the battery is transported to the evaporator and/or the fin of the condenser by the heat pipe,
a heat pump mechanism is formed by the condenser and/or the evaporator, the condenser and/or the evaporator is used in an air conditioner for a vehicle.

11. The battery temperature control system according to claim 10, further comprising another heat pipe, wherein
one end portion of the other heat pipe is thermally connected to the battery, and another end portion of the other heat pipe is thermally connected to a heat generation portion, and when the battery is heated, heat generated from the heat generation portion is transported to the battery by the other heat pipe.

12. The battery temperature control device according to claim 1 or 2, wherein the battery further includes a heat receiving plate that is in contact with a side surface of the battery cell.

13. The battery temperature control device according to claim 12, wherein the one end portion of the heat pipe is directly in contact with a back surface of the heat receiving plate, thereby allowing the heat receiving plate and the one end portion of the heat pipe to be thermally connected.

14. The battery temperature control device according to claim 12, wherein a portion of the heat pipe that is in contact with the heat receiving plate of the battery and a portion of the heat pipe that is in contact with the evaporator are processed into a flat shape.

15. The battery temperature control device according to claim 1 or 2, wherein a body portion of the evaporator is provided with a plurality of passages for a refrigerant, and corrugated radiation fins are disposed between the passages.

16. The battery temperature control device according to claim 1 or 2, wherein battery cells are in direct contact with each other, and the battery is located away the condenser and/or the evaporator.

* * * * *